United States Patent
Watson et al.

(10) Patent No.: US 10,742,625 B2
(45) Date of Patent: Aug. 11, 2020

(54) AUTOMATED DELIVERY OF SECURITY CREDENTIALS TO SCHEDULED CREW

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

(*) Notice: Subject to any disclaimer, the term of this patent is extended or adjusted under 35 U.S.C. 154(b) by 397 days.

(21) Appl. No.: 15/281,920

(22) Filed: Sep. 30, 2016

(65) Prior Publication Data

US 2018/0097786 A1 Apr. 5, 2018

(51) Int. Cl.
*H04L 29/06* (2006.01)

(52) U.S. Cl.
CPC ........ *H04L 63/062* (2013.01); *H04L 63/0428* (2013.01); *H04L 63/0838* (2013.01); *H04L 63/108* (2013.01)

(58) Field of Classification Search
CPC . H04L 63/062; H04L 63/108; H04L 63/0428; H04L 63/0838
See application file for complete search history.

(56) References Cited

U.S. PATENT DOCUMENTS

| | | | |
|---|---|---|---|
| 7,228,438 B2 | 6/2007 | Bushmitch et al. | |
| 2002/0095507 A1 | 7/2002 | Jerdonek | |
| 2007/0226783 A1 | 9/2007 | Mimlitsch | |
| 2008/0085691 A1* | 4/2008 | Harvey | H04B 7/18508 455/187.1 |
| 2008/0086637 A1* | 4/2008 | Royalty | H04L 63/105 713/168 |
| 2014/0380501 A1* | 12/2014 | Niss | G06F 21/62 726/27 |
| 2015/0203216 A1* | 7/2015 | Goldstein | H04L 63/083 701/31.4 |
| 2015/0327307 A1* | 11/2015 | Randrianasolo | H04W 12/04 370/329 |
| 2016/0036513 A1* | 2/2016 | Klippert | H04W 4/40 455/15 |
| 2016/0210247 A1* | 7/2016 | Noll | G06F 12/1466 |
| 2016/0212618 A1* | 7/2016 | Henzl | H04B 5/0025 |

FOREIGN PATENT DOCUMENTS

CA 2896118 1/2016

* cited by examiner

*Primary Examiner* — Joseph P Hirl
*Assistant Examiner* — Chi D Nguy
(74) *Attorney, Agent, or Firm* — Perkins Coie LLP

(57) ABSTRACT

A system for delivering to one or more crewmember computing devices a security credential for accessing a management interface of an electronics system of a vehicle has a local security credential generator and a remote security credential relay in communication therewith. One or more security credential destinations are identified from a correlation of a vehicle identifier accompanying the security credential transmitted to the remote security credential relay to one or more crewmember computing devices as defined in a crewmember staffing schedule. The security credential is then passed to the crewmember computing devices. A local login controller grants access to the management interface in response to a validation of the security credential transmitted thereto from the crewmember computing device.

20 Claims, 3 Drawing Sheets

AUTOMATED DELIVERY OF SECURITY CREDENTIALS TO SCHEDULED CREW

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data security in computer systems onboard aircraft, and more particularly, to the automated delivery of security credentials to crewmembers that are scheduled for staffing an aircraft.

2. Related Art

Amongst the many advancements in aircraft technology, improvements in passenger comfort and convenience have received much attention. With air travel typically involving journeys that span at least a few hours in duration, if not longer, carriers have sought out various solutions for keeping passengers engaged. One of the most common, in part driven by the wide availability of computer systems capable of delivering a range of multimedia content, is an on-board in-flight entertainment (IFE) system. Typical IFE systems encompass the individual displays and input/output components such as multi-function remote controls and audio output jacks that are installed on the seatbacks, armrests, or other interior cabin structures for use by the passenger, along with the client terminal computer systems and related networking components. Additionally, IFE systems also encompass the central server computer system from which content data may be retrieved for individualized presentation/interaction.

Such content may include recently released movies, television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many IFE systems also include video games that may be played by the passenger.

Although the availability of low-cost data storage has vastly increased the multimedia content selections offered via the IFE system, it is nevertheless limited because specific programming desired by any given passenger may not be loaded onto the server. Thus, passengers who have such specific content preferences may bring on board their own portable electronic devices (PEDs) such as smart phones, media players, electronic readers, tablets, laptop computers, and so forth, which can be loaded with the desired music, video, games, and other multimedia content of their choosing. This, too, is limited, particularly in comparison to the content that is available in the Internet.

With the ubiquity of Internet access on the ground, whether by way of cellular data connections, public WiFi networks, and so forth, passengers have become accustomed to ready access to the Internet, even during flight. In response to this demand, the carriers, aircraft manufacturers, and in-flight entertainment system providers alike have developed and deployed on-board Internet access solutions. Not only can the Internet access be utilized to retrieve multimedia entertainment content, the PEDs may be put to more productive uses that oftentimes require access to the Internet. For example, PEDs may have installed thereon various e-mail and instant messaging client applications, stock trading applications, banking applications, file sharing applications, cloud-based notetaking applications, and countless other productivity software. Furthermore, there may be dedicated applications that have functions that are particularly useful during travel, such as trip and connecting flight/departure gate tracking. Also popular are applications that are not necessarily productivity-related but still require Internet access, such as sports score updates, text-based news, and so forth. To a certain extent, these functionalities may be implemented in the IFE system as well.

In-flight Internet access is provided via an onboard WiFi network, to which the PEDs and IFE terminal units connect. In this regard, there may be several WiFi access points located throughout the cabin, each of which are connected to a satellite uplink module that is in communication with a satellite. The satellite, in turn, may be in communication with a ground station that is connected to the Internet. The additional communications functionality thus provided warrant these systems to be referred to as in-flight entertainment and communications (IFEC) systems (connectivity is also frequently used instead of communications).

Throughout the operational cycle of the IFEC system, cabin crewmembers and ground-based maintenance crewmembers may need to access the various administrative functions thereof. For instance, it may be necessary for the onboard WiFi network to be temporarily disabled during flight, or activated or deactivated depending on radio frequency emissions restrictions in certain destination or origin locales. Similarly, the satellite communications link may be enabled to override regulatory limitations for satellite transmissions. Furthermore, it may be necessary to disable the entirety of the IFEC system during emergencies, or to cycle power if there is an error condition that requires such a procedure. When the aircraft is on the ground, the maintenance crew may upload new content to the IFEC system. These functions are typically accessed via a crew management interface that is being executed on a crew terminal installed in the aircraft. Because only an individual that is physically present in proximity to the crew terminal can access such administrative features of the IFEC system, basic authentication procedures such as persistent passcodes/passwords and so forth are understood to be sufficient for restricting access thereto.

It is now common for crewmembers (flight crew, cabin crew, and ground crew) to be assigned a PED. For example, flight crew and cabin crew members may utilize the PED as an electronic flight bag (EFB), on which information vital to flight operations such as aircraft manuals, navigational and aeronautical charts, route manuals, logbooks, aircraft operating procedure checklists, weather reports, and the like. Similarly, ground crew members may utilize the PED as an informational reference during maintenance operations. Whether used during flight or while on the ground, the PEDs may be programmed with a mobile crew management interface (MCMI) application that interfaces wirelessly with the various avionics systems, including the IFEC system and the administrative functions thereof provided via the crew management interface. The inputs to the graphical user interface of the MCMI application are operative to transmit commands to the IFEC system for execution thereon.

Conventionally, access to the crew management interface of the IFEC system via the MCMI application running on the PED is restricted until a one-time password (OTP) is entered. The OTP is generated by the crew terminal via the crew management interface, and is then entered into the MCMI application via the PED. After an end-of-flight event such as Weight-on-Wheels, Close of Flight, Doors Open, and so on, the IFEC system is understood to invalidate all of the active OTPs, and ends the sessions of those PEDs that have been logged into the crew management interface via the MCMI application.

There are several deficiencies with such an authentication modality, however. The requirement for the user to be physically present at the control panel/crew terminal is laborious and constitutes a substantial operational overhead, notwithstanding the fact that this requirement provides additional assurances that the user is who he/she is purporting he/she is. This may be mitigated to some extent by permitting the use of the once-generated OTP across multiple PEDs, such that it is only necessary for a single user to generate the OTP by being physically present at the crew terminal. The generated OTP must nevertheless be circulated amongst the crewmembers, however, but the operational overhead is still substantial when the OTP must be generated by a cabin crew member, and then relayed to the flight crew members that may be restricted to the flight deck. Accordingly, there is a need in the art for the automated delivery of security credentials to crewmembers scheduled for staffing an aircraft.

BRIEF SUMMARY

The advanced delivery of security credentials used to access administrative functions of an aircraft in-flight entertainment and communications (IFEC) system is disclosed, and the need for crewmembers to use a crew terminal on the aircraft to generate a one-time password for gaining access to the IFEC administration interface is eliminated. In accordance with various embodiments, the system automatically generates the one-time password at the end of the flight, and sends it to the next flight crew. Alternative embodiments contemplate the aircraft operator/carrier generating the one-time password, and sending it to the next flight crew and to the aircraft.

One aspect of the present disclosure contemplates a system for delivering to one or more crewmember computing devices a security credential for accessing a management interface of an electronics system of a vehicle. The system may include a local security credential generator, and the security credential may be generated thereby in response to a vehicle travel termination event. The security credential may also be associated with a vehicle identifier corresponding to the vehicle. The system may also include a remote security credential relay that is in communication with the local security credential generator. Additionally, the remote security credential relay may be receptive to a transmission of the security credential from the local security credential generator. One or more security credential destinations may be identified from a correlation of the vehicle identifier accompanying the security credential to corresponding one or more specific ones of the crewmember computing devices as defined in a crewmember staffing schedule. The remote security credential relay may be configured to transmit the security credential to the one or more specific ones of the crewmember computing devices corresponding to the respective one or more identified security credential destinations. There may also be a local login controller in communication with the one or more specific ones of the crewmember computing device. The local login controller may grant access to the management interface of the electronics system of the vehicle in response to a validation of the security credential transmitted thereto by the one or more specific ones of the crewmember computing devices.

Another aspect of the present disclosure is a method for delivering a security credential to a crewmember computing device for access to a management interface of an in-flight entertainment and communications (IFEC) system. The method may include a step of generating the security credential with a local security module running on the IFEC system. The security credential may be associated with an aircraft identifier. Thereafter, there may be a step of transmitting the security credential and the associated aircraft identifier from the local security module to a remote security credential relay. The method may further include correlating the aircraft identifier associated with the received security credential to a security credential destination in a crewmember manifest for a specific flight. The security credential destination may correspond to the crewmember computing device assigned to a specific crewmember staffed on the specific flight. There may also be a step of transmitting the security credential from the remote security credential relay to the crewmember computing device as designated by the security credential destination.

Yet another aspect is a system for delivering to one or more crewmember computing devices a security credential for accessing a management interface of an electronics system of a vehicle. The system may include a local login controller that is in communication with the one or more crewmember computing devices. There may also be a remote security credential generator, and the security credential may be associated with a vehicle identifier corresponding to the vehicle. The system may include a remote security credential relay in communication with the remote security credential generator. One or more security credential destinations may be identified from a correlation of the vehicle identifier associated with the security credential to corresponding one or more specific ones of the crewmember computing devices as defined in a crewmember staffing schedule. The remote security credential relay may be configured to transmit the security credential to the local login controller and to the one or more specific ones of the crewmember computing devices corresponding to the respective one or more identified security credential destinations. The local login controller may grant access to the management interface of the electronics system of the vehicle in response to a validation of the security credential transmitted thereto by the one or more specific ones of the crewmember computing devices.

In accordance with another aspect, there is a method for delivering a security credential to a crewmember computing device for access to a management interface of an IFEC system of an aircraft. The method may include generating the security credential with a remote security module, then deriving from a crewmember manifest one or more security credential destinations corresponding to crewmember computing devices assigned to respective crewmembers staffed on a particular flight of the aircraft. There may also be a step of transmitting the security credential from the remote security module to the crewmember computing devices designated as the security credential destinations. The method may also include transmitting the security credential from the remote security module to a local security module connected to the management interface of the IFEC system of the aircraft.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated aspects of systems delivering security credentials to crewmember computing devices. This description is not intended to represent the only form in which the aspects of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, local and remote, and the like are used solely to distinguish one from another entity without necessarily requiring or implying any actual such relationship or order between such entities.

Figure 1:
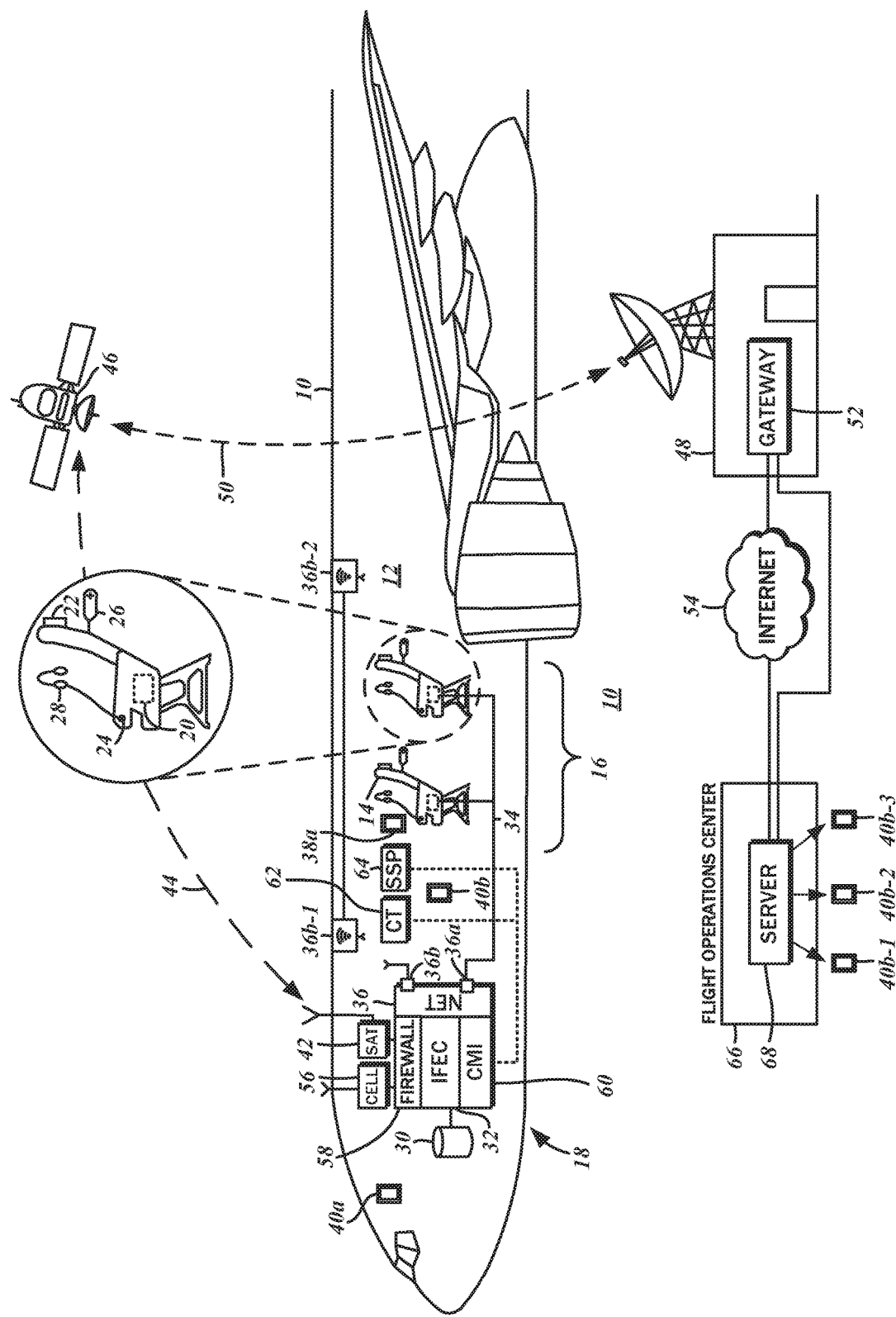
FIG. 1 is a diagram illustrating an aircraft operations environment in which the presently disclosed system for the automated delivery of security credentials to scheduled crewmembers may be implemented.

The diagram of FIG. 1 depicts an exemplary aircraft 10 in which various aspects of the presently disclosed systems and methods may be implemented. Within a fuselage 12 of the aircraft 10 there are seats 14 arranged over multiple rows 16, and each seat 14 accommodating a single passenger. Although the features of the present disclosure will be described in the context of the passenger aircraft 10 and amenities therefor, other passenger vehicles such as trains, watercraft, buses, and others utilizing integrated entertainment systems may be substituted.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14 or by mounting on a bulkhead.

The display 22 is understood to be a conventional liquid crystal display (LCD) screen with a low profile that is suitable for installation on the seatback. Each passenger can utilize an individual headset 28, supplied by either the airline or by the passenger, which provides a more private listening experience. In the illustrated arrangement, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including three sockets or a standard audio output without noise canceling. In alternate embodiments, each display 22 may incorporate a terminal unit 20 to form a display unit referred to in the art as a smart monitor.

A common use for the terminal unit 20 installed on the aircraft is the playback of various multimedia content. The terminal unit 20 may be implemented with a general-purpose data processor that decodes the data files corresponding to the multimedia content and generates video and audio signals for the display 22 and the audio output 24, respectively. This multimedia content may include movies, television shows, such as news programs, comedy, documentaries, and informational content pertinent to the flight destination. Furthermore, multimedia content may also encompass audio-only programming, as well as interactive games, flight progress mapping, flight status displays, newspapers/magazines readable on the display 22, and so on. Broadly, multimedia content is intended to refer to any content of varying duration and form that can be presented to the passenger via the display 22 or the audio output 24, or a combination thereof.

The data files of the multimedia content may be stored in a database 30 associated with the IFEC system 18. Specifically, the database 30 and is connected to and managed by an IFEC server 32, which may be a specifically adapted general purpose computer system configured as a server to provide data in response to requests therefor. Various software modules are understood to be incorporated into the IFEC server 32, including a streaming server that retrieves the multimedia content from the database, as well as a cataloging/menu application with which the user interacts to select the desired multimedia content.

The passenger can play games being executed on the terminal unit and otherwise interact with the multimedia content with the remote controller 26. Navigating through the vast multimedia content library and selecting ones for viewing and/or listening is also possible with the remote controller 26, though in some embodiments, a touch-screen display may be provided for a more intuitive interaction with the multimedia content library. In either case, the terminal unit 20 is loaded with a content selection software application that is executed by the data processor and accepts input from the remote controller 26 or other input modality and generates a response on the graphical interface presented on the display 22.

Each of the terminal units 20 may be connected to the IFEC server 32 over an aircraft local area network 34, one segment of which may preferably be Ethernet. Thus, the IFEC server 32 includes a local data communications module 36, and more specifically, an Ethernet data communications module 36a, e.g., an Ethernet switch or router.

One or more passengers may utilize a portable electronic device (PED) 38 during flight. For purposes of the present disclosure, passenger PEDs 38 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

In addition to the passengers bringing the PEDs 38 on board for entertainment or productivity use, flight crew and cabin crew may likewise employ computing devices to carry out their respective duties during flight. For instance, the flight crew may utilize a crewmember PED 40a as an electronic flight bag (EFB). The cabin crew may be issued a crewmember PED 40b that is loaded with specific applications for managing cabin operations. Henceforth, the flight crew electronic flight bag and the cabin crew-issued devices will be referred to as crewmember PEDs 40, which are understood to encompass smart phones, tablet computer, laptop computers, and so forth.

Almost all conventional passenger PEDs 38 have a WLAN (Wi-Fi) module, so the local data communications module 36 of the IFEC server 32 also includes a WLAN access point 36b. The PEDs 38, 40, via the aircraft local area network 34, may connect to the IFEC server 32 to access various services offered thereon such as content downloading/viewing, shopping, and so forth.

Typically, a single WLAN access point 36b is insufficient for providing wireless connectivity throughout the cabin, so additional WLAN access points 36b-1 and 36b-2 may be installed at various locations spaced apart from each other. These additional WLAN access points 36b-1 and 36-b2 may be connected to the IFEC server 32 over an Ethernet link that is part of the aforementioned aircraft local area network 34. The local area network interface or the local data communications module 36 is understood to encompass the hardware components such as the WLAN transceiver 36b and the Ethernet router/switch 36a, as well as the software drivers that interface the hardware components to the other software modules of the IFEC server 32.

The IFEC system 18 may also offer Internet access to the connecting terminal units 20 as well as the PEDs 38, 40. One contemplated modality that operates with the IFEC system 18 is a satellite module 42 that establishes a data uplink 44 to a communications satellite 46. According to one exemplary embodiment, the data uplink 44 may be Ku-band microwave transmissions. However, any suitable communications satellite 46, such as Inmarsat or Iridium may also be utilized without departing from the present disclosure. The data transmitted to the communications satellite 46 is relayed to a satellite communications service provider 48. A data downlink 50 is established between the communications satellite 46 and the satellite communications service provider 48 that, in turn, includes a network gateway 52 with a connection to the Internet 54. In another embodiment, the aircraft 10 can be equipped with a cellular modem 56 instead of, or in addition to the satellite module 42 for remote connectivity, which similarly establishes a communications link to the Internet 54 via terrestrial cellular sites in accordance with modalities well known in the art.

The terminal unit 20 or the PEDs 38, 40 is understood to connect to the IFEC system 18 via the aircraft local area network 34 established by the local data communications module 36, which relays the data transmissions to the satellite module 42. The data is transmitted to the communications satellite 46 over the data uplink 44, and the communications satellite 46 relays the data to the satellite communications service provider 48 over the data downlink 50. The network gateway 52 then routes the transmission to the Internet 54. Due to the high costs associated with the communications satellite 46 and cellular networks in roaming mode, carriers may limit data traffic to and from the satellite module 42 and the cellular modem 56 with a firewall 58.

During flight operations, it may be necessary for the crewmembers to perform certain administrative tasks in relation to the IFEC system 18 generally, and on the IFEC server 32 specifically. Furthermore, between flights, ground crewmembers may perform routine maintenance and content updating tasks. The IFEC server 32 therefore includes a crew management interface (CMI) 60 through which such tasks may be performed. In some implementations of the IFEC system 18, there is a crew terminal 62 that is installed within the aircraft 10 that is connected to the IFEC server 32, and the crew management interface 60 thereof. The crew terminal 62 is understood to be a general purpose computer system through which various commands may be issued to the IFEC server 32 and other avionics systems installed on the aircraft 10, and may be mounted in crew access areas such as the galley insert remote control center.

Alternatively, the aircraft 10 may be equipped with a simple switch panel (SSP) 64 that is a set of physical switches, status lights, and a data communications port (e.g., RJ-45) that may be utilized by the crewmembers to control the IFEC server 32 to perform various maintenance and operation functions. The simple switch panel 64 is understood to be an alternative to the crew terminal 62, and provides limited control and interaction with the IFEC server 32. In one embodiment, the simple switch panel 64 has one control switch to turn on and turn off power to the IFEC system 18. This may be utilized during an emergency or to cycle power if there is a condition requiring power cycling. Furthermore, such switch may be used to deactivate the entire IFEC system 18 if there is a suspected network intrusion from a passenger. The simple switch panel 64 may include another switch that manually activates and deactivates the satellite module 42, or specifically the transmitter thereof, in order to override the onboard regulatory database that selectively activates the satellite module 42 based upon aircraft location. This may be useful for ground testing and commissioning purposes. There may be additional switches to activate and deactivate different local data communications modules 36 such as phones and the WLAN access point 36b, or place the same into a maintenance mode.

The simple switch panel 64 may also include various indicators. One such indicator is understood to be a service status light, which may indicate when the IFEC system 18 is operating normally, when the IFEC system is in receive only mode, or when there is a fault condition. Another indicator may be used to inform crewmembers of when various cabin status signs are activated or deactivated, such as a sign for when mobile phone usage is permitted or prohibited.

The foregoing arrangement of the IFEC system 18, along with its constituent components, have been presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

Instead of using the simple switch panel 64, the interface thereof may be implemented in a crewmember PED 40. Specifically, the cabin crewmember PED 40b may have a mobile crew management interface (MCMI) application installed thereon that interfaces with the IFEC system 18, either directly with the IFEC server 32 or through the crew management interface 60. The mobile crew management interface application may have the identical interface elements as the simple switch panel 64, with the physical switches and indicators being replaced with counterpart interactive elements presented on the graphical user interface of the crewmember PED 40. Alternatively, the same functionality that is accessible via the crew terminal 62 may be implemented and made available via the mobile crew management interface application.

Although crewmember PEDs 40 may be authenticated and validated against pre-installed security credentials upon being activated for in-flight service, further security measures may be implemented in order to limit access to the administrative functions of the crew management interface 60 only to the crewmember PEDs 40. One security measure is to require a one-time password (OTP) that is generated by the crew management interface 60 and presented to the crewmember at the crew terminal 62, and entered into a mobile crew management interface. Provided that the one-time password as presented through the crewmember PED 40 is validated against the one that is generated by the crew management interface 60, further access to the administrative functions is permitted.

Various aspects of the present disclosure contemplate the advance distribution of the one-time password or other like security credential to crewmembers scheduled to the aircraft 10. The one-time password may be delivered directly to the crewmember PEDs 40 prior to the crewmember to which such PEDs 40 is assigned board the aircraft 10. Commercial and business flight operators typically have a flight operations center 66 that handles aircraft and crewmember scheduling and management, including the provisioning of the PEDs 40 to crewmembers.

The flight operations center 66 is understood to be the hub of the information technology infrastructure that is used to track and communicate with the aircraft 10 in the fleet, and accordingly one or more server computer systems 68 may be deployed therein. Such server computer systems 68 may communicate with the aircraft 10 via a closed communications system, or alternatively, via the Internet 54 for certain low-priority/sensitivity data. Although FIG. 1 illustrates only a limited number of communications links between the flight operations center 66 and the aircraft 10, these are understood to be by way of example only and not of limitation.

The server computer system 68 may also be utilized for distributing the one-time password to the crewmember PEDs 40. The block diagram of FIG. 1 illustrates a plurality of cabin crewmember PEDs 40b-1 to 40b-3 that are in communication with the server computer system 68, and details of the various aspects of the present disclosure that may implement the functionality of delivering the one-time passwords thereto will be described more fully below. In the event that the one-time password is unable to be delivered directly to the crewmember PEDs 40, or if there is an unexpected change in crewmember staffing, it is expressly contemplated that existing modalities for generating the one-time password on the crew terminal 62 to be entered manually into the crewmember PED 40 remain available.

Figure 2:
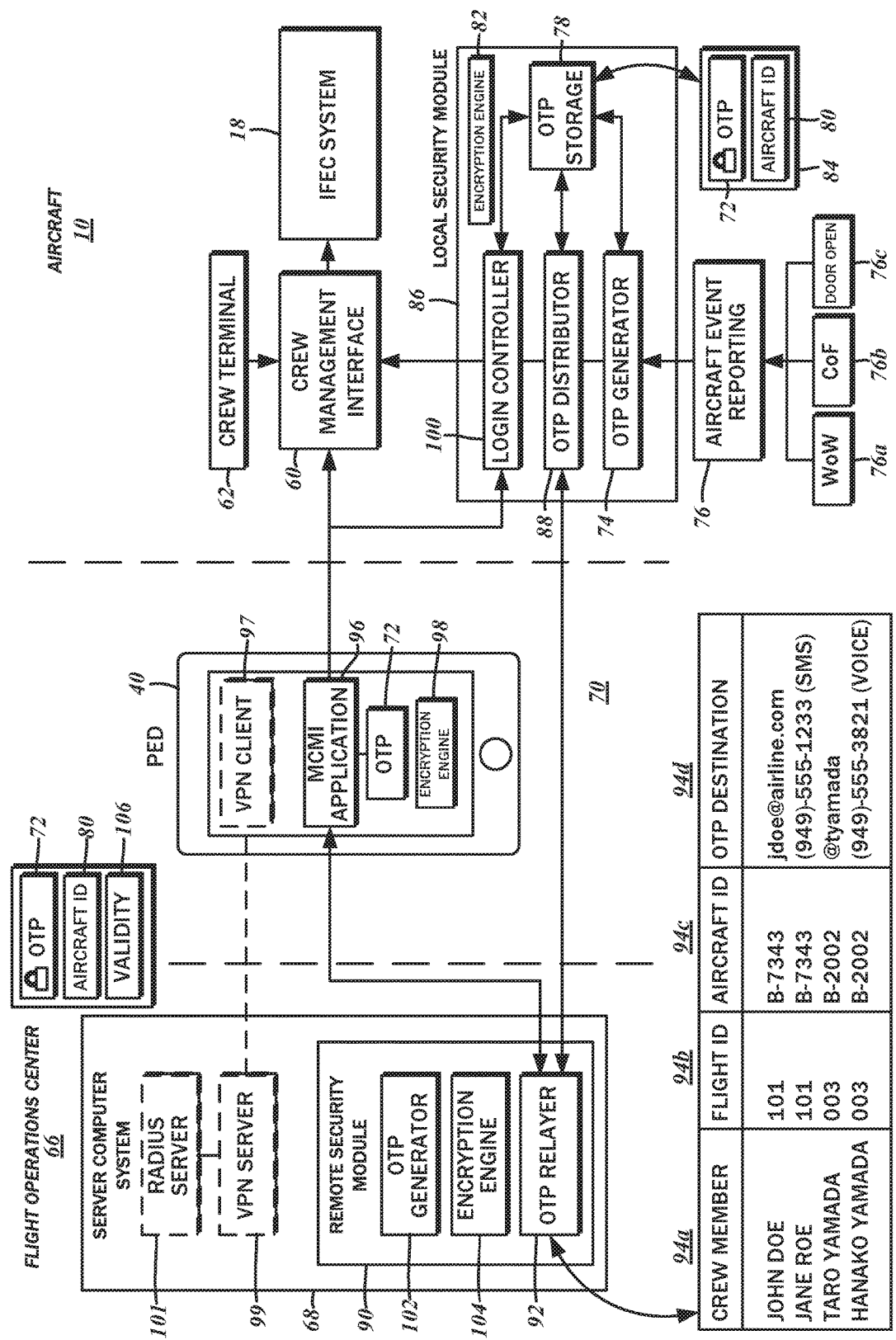
FIG. 2 is a block diagram of a system for delivering a security credential to crewmember computing devices in accordance with one embodiment the present disclosure.

The block diagram of FIG. 2 illustrates a system 70 for delivering a security credential to crewmember PEDs 40 for accessing the crew management interface 60 of the IFEC system 18. In accordance with various aspects, the security credential is a one-time password 72 that is generated in advance of a flight, and is securely transmitted to the crewmember PEDs 40. The length and the character set utilized for the one-time password 72 may be varied depending on the balance struck between security and ease of use. For example, while the security level is minimal if a three-digit number is used, it would be the easiest to remember and use. On the other hand, a one-time password comprised of case-sensitive alphanumeric characters with an extended length (more than a few characters) is understood to have a higher level of security but commensurately more difficult to remember and cumbersome to use. The present disclosure contemplates the direct delivery of the one-time password 72 to the crewmember PED 40, so usability concerns may not be significant, but according to some embodiments a manual entry modality may be retained as a backup measure, so the complexity of the one-time password 72 may be kept to reasonable levels. It is also possible to utilize one-time passwords 72 of varying complexity depending upon the usage context. When the one-time password 72 is being generated manually at the crew terminal 62 and entered into the crewmember PED 40, then one of lesser complexity may be used in view of the heightened validity assumptions that may be drawn as a consequence of the crewmember being physically present. However, if the one-time password 72 is being directly delivered to the crewmember PED 40 in accordance with the aspects of the presently disclosed system 70, then one of higher complexity may be utilized.

Figure 3:
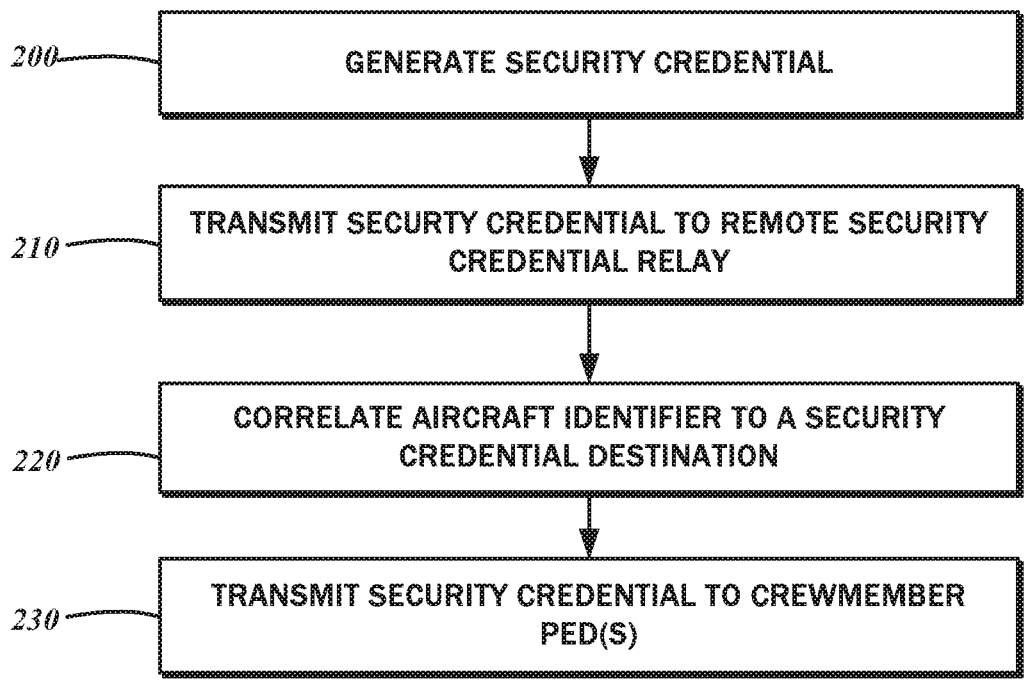
FIG. 3 is a flowchart illustrating one embodiment of a method for delivering a security credential to a crewmember device in which the security credential is generated on the aircraft.

The present disclosure also contemplates a method for delivering a security credential to a crewmember PED 40. With additional reference to the flowchart of FIG. 3, one aspect of the method thus begins with a step 200 of generating the security credential, e.g., the one-time password 72 that is generated by a local security credential generator 74, which may also be referred to as an OTP generator. Specifically, the one-time password 72 is so generated in response to a vehicle travel termination event.

In implementations for the aircraft 10, the avionics systems thereof report various end-of-flight events, which are shown generalized as aircraft event reports 76 and may be referred to more generally as vehicle status reports. The aircraft event reports 76 correspond to end-of-flight events including a Weight on Wheels (WoW) indicator 76a, a Close of Flight (CoF) indicator 76b, as well as a Door Open indicator 76c. Any one of these indicators are understood to signal the conclusion of the flight, as the Weight on Wheels indicator 76a is set once the aircraft lands, the Close of Flight indicator 76b is set when an ACARS (Aircraft Communications Addressing and Reporting System) message is sent by the flight crew at the conclusion of the flight, and the Door Open indicator 76c is set when the aircraft has reached the terminal and the doors are opened to allow passengers to disembark. When any of these events occur, the system 70 generates the one-time password 72 for the next flight. Instead of initiating the generation of the one-time password 72 in response to an aircraft event report 76, it is also possible to do so at a predetermined time before the scheduled arrival of the aircraft 10. Once generated, the one-time password 72 may be stored in a security credential storage 78, also referred to as an OTP storage, for comparison against one-time passwords that are provided by the crewmember PED 40 to gain access to the crew management interface 60.

So that the one-time password 72 may be delivered to the crewmember PED 40 that is assigned to the crewmember that is scheduled to staff the next flight of the aircraft 10, the one-time password 72 is accompanied by an aircraft identifier 80, which may also be referenced more generally as a vehicle identifier. The one-time password 72 is encrypted in accordance with widely utilized data encryption techniques known in the art, with such functionality being provided by a separate local encryption engine 82. In one implementation, the local encryption engine 82 utilizes digital certificates with RSA 2048 bit keys. However, this is understood to be by way of example only and not of limitation. Any other suitable encryption engine 82 may be substituted without departing from the scope of the present disclosure. It is also possible for the security credential transmission 84, including the one-time password 72 and the aircraft identifier 80, to be encrypted.

The local security credential generator 74, the security credential storage 78, and the local encryption engine 82 are understood to be logical sub-components of a local security module 86, which may be implemented as a series of pre-programmed instructions that are executed by a computer system. Those having ordinary skill in the art will readily recognize the various base components of such a computer system that would be needed for implementing the functionality of the local security module 86, and so the details thereof are omitted for the sake of brevity.

The local security module 86 additionally includes a security credential distributor 88, also referred to as an OTP distributor, that communicates with a remote security module 90 comprised of various logical sub-components implemented as a series of pre-programmed instructions executed by the server computer system 68 associated with the flight operations center 66. The remote security module 90 includes a remote security credential relay 92, which may be referred to as an OTP relayer. The remote security credential relay 92 is in communication with the local security credential generator 74 through the OTP distributor, and is receptive to security credential transmission 84 therefrom. The contemplated method for distributing security credentials illustrated in the flowchart of FIG. 3 thus includes a counterpart step 210 of transmitting the one-time password 72 and the aircraft identifier 80 from the local security module 86 to the remote security credential relay 92.

As indicated above, the security credential transmission 84 includes the one-time password 72 as well as the aircraft identifier 80, which designates the aircraft 10 from which the one-time password 72 was designated. The aircraft identifier 80 is used to designate the crewmember PEDs 40 of those crewmembers that are assigned to the next flight of the aircraft 10 as set forth in the aircraft identifier 80. The remote security module 90 utilizes a crewmember staffing schedule 94 to correlate the received aircraft identifier 80 with the crewmembers scheduled for the next flight of the aircraft 10 in accordance with a step 220, and deliver the one-time password 72 to the crewmember PEDs 40 assigned to such crewmembers.

At the most basic level, the crewmember staffing schedule 94 may be defined as a table comprised of multiple rows each corresponding to a specific crewmember, and multiple columns corresponding to various fields or attributes associated with such a crewmember. A first column 94a identified the crewmembers by name, while a second column 94b sets forth the flight number/identifier to which the crewmember is next assigned. Additionally, there is a third column 94c that identifies the aircraft being operated on the flight. Different modalities for transmitting the one-time password 72 to the crewmember PED 40 are contemplated, including, but not limited to e-mail, short message service (SMS), telephone call, and instant messaging. The preferred modality may be defined in the crewmember staffing schedule 94 in a fourth column 94d thereof, with the destination address, phone number, etc. being set therein.

The foregoing structure of the crewmember staffing schedule 94 is presented by way of example only and not of limitation. Other ways in which the information contained therein is organized may be readily substituted without departing from the scope of the present disclosure. More, less or different fields/attributes may be included in the crewmember staffing schedule 94. For example, instead of identifying the crewmember by name, an employee ID number may be utilized. Along these lines, only one of the flight identifier or the aircraft identifier may be necessary to determine the particular crewmember PED 40 to which the one-time password 72 is transmitted.

The scheduling/staffing information across the entire fleet of a carrier is understood to be pre-existing, as it is essential for coordinating flight operations. Accordingly, the structure and fields/attributes contained in the crewmember staffing schedule 94 is understood to be a copy thereof, or at least replicate the structure thereof. Such information may be stored in a dedicated central database to which various clients can connect to view and modify staffing schedules. In this case, the remote security credential relay 92 may directly access the database to retrieve select data elements used in the various embodiments of the present disclosure. The crewmember staffing schedule 94 in such an embodiment is understood to be such a dedicated database.

Once the security credential destination is determined from the aircraft identifier 80, the remote security credential relay 92 transmits the one-time password 72 to the specific crewmember PED 40 as designated in accordance with a step 230. For example, if the aircraft identifier 80 accompanying the one-time password 72 in the security credential transmission 84 is "B-7343," then the crewmembers "John Doe" and "Jane Doe" are to receive the one-time password, specifically on the crewmember PEDs 40 therefor. The crewmember staffing schedule 94 indicates that crewmember "John Doe" is set to receive the one-time password 72 at an e-mail address "jdoe@airline.com." In this case, the remote security credential relay 92 may connect to or otherwise invoke an e-mail transport server and transmit the one-time password 72 to the specified e-mail address. Along these lines, crewmember "Jane Roe" is also identified as being staffed on the aircraft 10 with the aircraft identifier of "B-7343," but the specified security credential destination is a mobile device with a phone number "949-555-1233," and the preferred modality set to short message service or text messaging. The remote security credential relay 92 may connect to a SMS sending service and transmit the one-time password 72 to the mobile device/crewmember PED 40 having the specified phone number.

As indicated above, the crewmember PED 40 is a conventional mobile computing device with a standard operating platform on which various applications may be installed and run. One such application that provides an interface to the crew management interface 60 of the IFEC system 18 is a mobile crew management interface (MCMI) application 96. Additionally, the MCMI application 96 cooperates with the remote security credential relay 92 to retrieve the one-time password 72 designated for the particular crewmember PED 40.

Because open/unsecured transport modalities such as e-mail and SMS are utilized between the server computer system 68 of the flight operations center 66, the one-time password 72 is understood to remain encrypted as was provided from the local security module 86. That is, upon receipt from the security credential distributor 88, the remote security credential relay 92 does not decrypt the one-time password 72 before transmission to the crewmember PED 40. For the purpose of decrypting the encrypted one-time password 72, the crewmember PED 40 includes an encryption engine 98 that corresponds to the local encryption engine 82 of the local security module 86.

Instead of relying on open/unsecured transport modalities, the remote security credential relay 92 may establish an interactive communications session over secure channels to the crewmember PED 40, in which such case it is possible for the one-time password 72 to be decrypted first by the remote security module 90. Optionally, the communications session may take place over a virtual private network (VPN). To this end, crewmember PED 40 may include a VPN client 97, and there may be a corresponding VPN server 99 at the flight operations center 66.

The virtual private network encrypts all data traffic between the server computer system 68 and the crewmember PED 40, and is understood to be Cisco IPSec-compliant. Different implementations of VPN may be utilized, with multiple VPN tunnels being supported. Different cryptographic functions to ensure data integrity such as SHA-1 (secure hash algorithm), MD5, and RSA may be provided, and multiple encryption modalities are contemplated, including DES, 3DES, and AES. Authentication may be performed over the RADIUS (Remote Authentication Dial In User Service) protocol to an existing remote RADIUS server 101.

Securing the transmissions between the server computer system 68 and the crewmember PED 40 with the VPN is presented by way of example only and not of limitation. Any other network security modality may be substituted without departing from the scope of the present disclosure.

Regardless of the transport modality, the operating platform of the crewmember PED 40 may be configured to generate alerts, specifically ones indicating that a one-time password has been loaded. It is expressly contemplated that such alerts are configured to hide the content of the one-time password 72 from a lock screen that may be accessible without first authenticating the user. Thus, the risk of unauthorized access using a one-time password 72 that is automatically loaded into a lost or stolen crewmember PED 40 is reduced.

The local security module 86 includes a local login controller 100 that is in communication with the crewmember PED 40. The MCMI application 96 attempts to gain access to the crew management interface 60, and is directed to the local login controller 100. Aside from the requesting conventional access credentials such as account name/identifier and corresponding password, the local login controller 100 requests the one-time password for validation against the one in the security credential storage 78. The MCMI application 96 retrieves the one-time password 72 stored on the crewmember PED 40, and transmits the same the local login controller 100. This transmission may take place over a secured/encrypted communications channel over the aircraft local area network 34. Upon validation of all of the requested security credentials (e.g., the account name, the account password, and the one-time password 72), the local login controller 100 grants access to the crew management interface 60.

Figure 4:
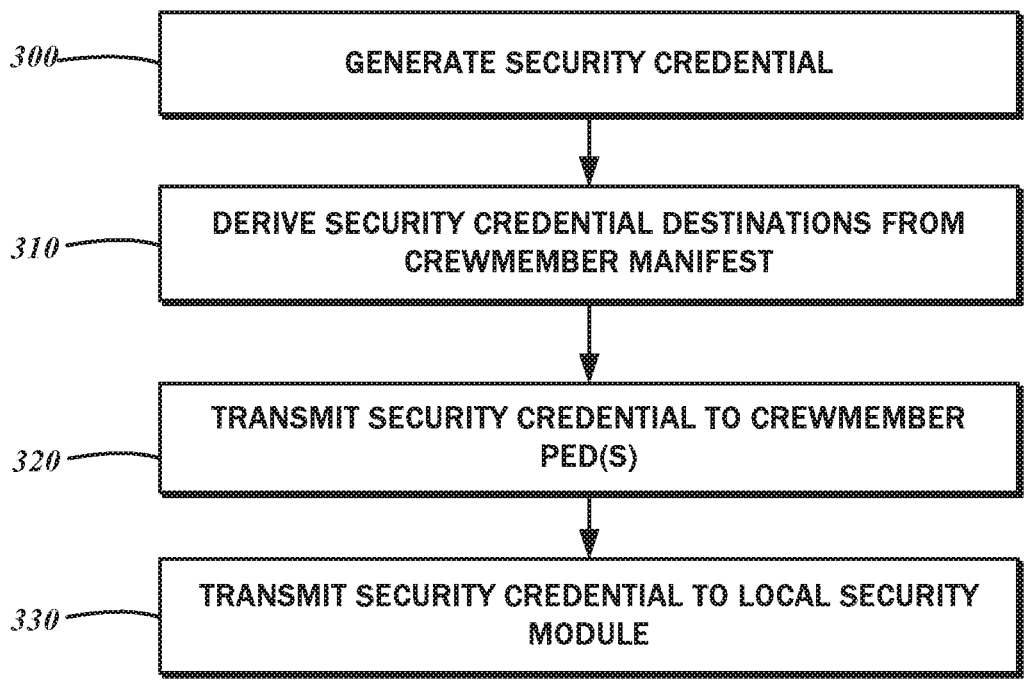
FIG. 4 is a flowchart illustrating another embodiment of the method for delivering a security credential to a crewmember device in which the security credential is generated remotely.

The foregoing embodiment of the system 70 generates the one-time password 72 at the aircraft 10 for distribution to the crewmember PEDs 40 via the remote security credential relay 92. An alternative embodiment in which the one-time password 72 is generated at the flight operations center 66 is also contemplated. The flowchart of FIG. 4 illustrates a method for delivering the security credential based upon such embodiment of the system 70, and begins with a step 300 of generating the one-time password 72 with the remote security module 90. The generated one-time password 72 is provided to specific aircraft 10 and to the crewmember PEDs 40 of those crewmembers staffed on such aircraft. The remote security module 90 in this embodiment includes a remote security credential generator 102, also referred to as a remote OTP generator. The one-time password 72 is encrypted with a remote encryption engine 104 similar to the local encryption engine 82.

The remote security credential relay 92 likewise accesses the crewmember staffing schedule 94 or crewmember manifest. Furthermore, the remote security credential relay 92 commands the remote security credential generator 102 to generate the one-time password 72 for an upcoming flight. Instead of the one-time password 72 being generated in response to end-of-flight events, the remote security credential generator 102 tracks the time and/or the active flights, and associates the generated one-time password 72 with an aircraft identifier 80 that is associated with an aircraft 10 with an upcoming staffing change. Based upon the associated aircraft identifier 80, a security credential destination may be derived from the crewmember staffing schedule 94 in accordance with a step 310 of the method for delivering the security credential. This may be achieved by correlating the aircraft identifier 80 to one or more crewmember PEDs 40.

In another example, the remote security module 90 detects that the aircraft 10 having an aircraft identifier 80 of "B-2002" is nearing the end of flight. The remote security credential relay 92 commands the remote security credential generator 102 to generate another one-time password 72, and encrypts the same with the remote encryption engine 104. The next flight operated with the same aircraft 10 is staffed by "Taro Yamada" and "Hanako Yamada" on flight 003. The security credential destination for "Taro Yamada" is an instant messaging system, with the account therefor that is "tyamada." The remote security credential relay 92 commands an appropriate instant messaging server to transmit a message to this account including the generated and encrypted one-time password 72. The security credential destination for "Hanako Yamada" is a voice telephone number, and so a telephony system may be commanded by the remote security credential relay 92 to call the crewmember PED 40 and synthesize speech including the one-time password 72. Thus, in the contemplated method, there is a step 320 of transmitting the one-time password 72 from the remote security module 90 to the crewmember PEDs 40 as designated with the security credential destinations derived in the previous step 310. The MCMI application 96 loads the provided one-time password 72 until it is presented to the local login controller 100 for gaining access to the crew management interface 60.

In addition to delivering the one-time password 72 to the crewmember PEDs 40, the remote security credential relay 92 provides the same to the local security module 86 of the aircraft 10 in a step 330. The remote security credential relay

92 may establish a secure data communications link to the security credential distributor 88, and uploads the generated one-time password 72 thereto for retention in the security credential storage 78. To the extent an unsecured or open data communications link is used, the one-time password 72 itself may remain encrypted for decryption by the local encryption engine 82 prior to being copied to the security credential storage 78. The local login controller 100 validates the one-time password 72 transmitted from the MCMI application 96 against this updated one on the security credential storage 78.

With the one-time password 72 being provided by the flight operations center 66, it is possible to use the same one over multiple flights being staffed by the same crewmembers. Accordingly, the security credential transmission 84 may include a validity duration 106. In one embodiment, the validity duration 106 may correspond to an anticipated vehicle journey time period, while in another embodiment, the validity duration 106 may correspond to an anticipated vehicle journey leg count that is deducted following the conclusion of each flight. Short haul aircraft may complete four to five flights with the same crewmembers in one day, and with the validity duration 106 being set to correspond to the number of legs or the number of hours in the journey with the same crewmembers, distributing and entering the one-time password 72 after each flight is unnecessary.

The authentication procedure for aspects in which the one-time password 72 is provided by the remote security module 90 is otherwise the same as that discussed in relation to the aspects in which the one-time password 72 is generated by the local security module 86. That is, the MCMI application 96 requests access to the crew management interface 60, and then directed to the local login controller 100. The stored one-time password 72 on the crewmember PED 40 is transmitted to the local login controller 100, and validates it against the one-time password 72 in the security credential storage 78. If validated, then the MCMI application 96 is permitted access to the crew management interface 60.

The particulars shown herein are by way of example only for purposes of illustrative discussion, and are presented in the cause of providing what is believed to be the most useful and readily understood description of the principles and conceptual aspects of the various aspects of the systems for the conversion of aircraft data over wireless networks for flight deck and cabin airline applications set forth in the present disclosure. In this regard, no attempt is made to show any more detail than is necessary for a fundamental understanding of the different features of the various aspects, the description taken with the drawings making apparent to those skilled in the art how these may be implemented in practice.

What is claimed is:

1. A system for delivering to one or more crewmember computing devices a security credential for accessing a management interface of an electronics system of a vehicle, the system comprising:
   an onboard computer system programmed to execute instructions to implement a local security credential generator, the security credential being generated thereby onboard the vehicle in response to a vehicle travel termination event and associated with a vehicle identifier corresponding to the vehicle; and
   a remote computer system programmed to execute instructions to implement a remote security credential relay offboard the vehicle and in communication with the local security credential generator and receptive to a transmission of the security credential therefrom, one or more security credential destinations being identified from a correlation of the vehicle identifier accompanying the security credential to corresponding one or more specific ones of the crewmember computing devices as defined in a crewmember staffing schedule, with the remote security credential relay being configured to transmit the security credential to the one or more specific ones of the crewmember computing devices corresponding to the respective one or more identified security credential destinations;
   wherein the onboard computer system is further programmed to execute instructions to implement a local login controller onboard the vehicle and in communication with the one or more specific ones of the crewmember computing devices;
   wherein the local login controller grants access to the management interface of the electronics system of the vehicle in response to a validation of the security credential transmitted thereto by the one or more specific ones of the crewmember computing devices.

2. The system of claim 1, further comprising:
   a local encryption module that encrypts the security credential for transmission to the remote security credential relay.

3. The system of claim 1, wherein the one or more crewmember computing devices are each loaded with a mobile crew management interface application that communicates with the management interface of the vehicle electronics system.

4. The system of claim 1, wherein the vehicle travel termination event is derived from a vehicle status report.

5. The system of claim 4, wherein the vehicle status report is selected from a group comprising: a weight-on-wheels indicator, a vehicle door open indicator, and a close of journey indicator.

6. The system of claim 1, wherein the vehicle travel termination event corresponds to a predefined time prior to a scheduled conclusion of vehicle travel.

7. The system of claim 1, wherein the security credential is a one-time password (OTP).

8. A system for delivering to one or more crewmember computing devices a security credential for accessing a management interface of an electronics system of a vehicle, the system comprising:
   an onboard computer system programmed to execute instructions to implement a local login controller onboard the vehicle and in communication with the one or more crewmember computing devices; and
   a remote computer system programmed to execute instructions to implement:
      a remote security credential generator offboard the vehicle, the security credential being associated with a vehicle identifier corresponding to the vehicle;
      a remote security credential relay offboard the vehicle and in communication with the remote security credential generator, one or more security credential destinations being identified from a correlation of the vehicle identifier associated with the security credential to corresponding one or more specific ones of the crewmember computing devices as defined in a crewmember staffing schedule, with the remote security credential relay being configured to transmit the security credential to the local login controller and to the one or more specific ones of the crewmember computing devices corresponding to the respective one or more identified security credential destinations; and a remote encryption module that encrypts the security credential for transmission to the local login controller and the one or more specific ones of the crewmember computing devices;

wherein the local login controller grants access to the management interface of the electronics system of the vehicle in response to a validation of the security credential transmitted thereto by the one or more specific ones of the crewmember computing devices.

9. The system of claim 8, wherein the security credential is assigned a validity duration.

10. The system of claim 9, wherein the validity duration corresponds to an anticipated vehicle journey time period.

11. The system of claim 9, wherein the validity duration corresponds to an anticipated vehicle journey leg count.

12. The system of claim 8, further comprising:
a local security credential generator, a local security credential being generated thereby in response to a request entered into a crew terminal directly connected to the management interface of the electronics system;
wherein the local login controller grants access to the management interface of the electronics system of the vehicle in response to a validation of the local security credential transmitted from the crewmember computing device.

13. The system of claim 8, wherein the security credential is a one-time password (OTP).

14. A method for delivering a security credential to a crewmember computing device for access to a management interface of an in-flight entertainment and communications (IFEC) system of a vehicle, the method comprising:
generating the security credential with a security module running on an information processing system onboard the vehicle, the security credential being associated with an aircraft identifier;

transmitting the security credential and the associated aircraft identifier from the security module to a security credential relay or distributor offboard the vehicle;
correlating the aircraft identifier associated with the received security credential to a security credential destination in a crewmember manifest for a flight, the security credential destination corresponding to the crewmember computing device assigned to a crewmember staffed on the flight; and
transmitting the security credential from the security credential relay or distributor to the crewmember computing device as designated by the security credential destination and to a login controller running on the information processing system onboard the vehicle.

15. The method of claim 14, further comprising:
receiving, on the IFEC system, the security credential transmitted from the crewmember computing device;
validating the security credential; and
granting access privileges to the management interface of the IFEC system for the crewmember computing device upon validating the security credential.

16. The method of claim 14, wherein the security credential is generated in response to a flight termination event.

17. The system of claim 16, wherein the flight termination event is derived from a vehicle status report.

18. The system of claim 17, wherein the vehicle status report is selected from a group comprising: a weight-on-wheels indicator, a vehicle door open indicator, and a close of journey indicator.

19. The system of claim 16, wherein the flight termination event corresponds to a predefined time prior to a scheduled conclusion of vehicle travel.

20. The system of claim 14, wherein the security credential is a one-time password (OTP).

* * * * *